3,092,589
METHOD OF PREPARING A CATALYST USED IN THE POLYMERIZATION OF ETHYLENE
Gaetano F. D'Alelio, South Bend, Ind., assignor, by direct and mesne assignments, to Dal Mon Research Co., Cleveland, Ohio, a corporation of Delaware
No Drawing. Filed Nov. 6, 1957, Ser. No. 694,730
4 Claims. (Cl. 252—441)

This invention pertains to a novel synthesis of ethylene polymers.

Summarily, my invention comprises polymerizing ethylene in an inert solvent at superatmospheric pressure in the presence of a catalyst prepared by grinding a mixture of Zr and $ZrCl_4$ in an inert atmosphere with or without the presence of an inert solvent.

The following examples illustrate without limiting the invention.

*Example 1*

Five grams of Zr powder and 1.1 grams of $ZrCl_4$ are wet ground in 50 ml. toluene in an inert $N_2$ atmosphere for 6 days in a conventional stainless steel ball mill of 4 ounce capacity loaded to approximately one-half its bulk volume with ½ inch stainless steel balls. The charge is washed through a ¼ inch stainless steel screen situated in a dry box and into a 200 cc. stainless steel bomb with an additional 50 ml. of toluene. The transfer is made in a dry box maintained under a slight pressure of nitrogen to avoid contamination with moisture, oxygen, and the like. Since the catalyst is extremely pyrophoric and sensitive to such contaminants, it therefore should always be handled under inert conditions. The bomb is closed, pressurized with ethylene to about 500 p.s.i., and heated to a temperature of about 125° C. During the polymerization reaction, frequent repressurizing with ethylene is necessary to maintain the aforesaid pressure. After 12 hours the polymerization reaction is terminated. The bomb is cooled and vented and upon opening a good yield of solid polyethylene is obtained.

*Example 2*

Five grams Zr and 2 grams $ZrCl_4$ are ball milled in 15 ml. of toluene as in Example 1 supra for 8 days. The contents of the mill are discharged along with 50 ml. toluene added thereto into a 200 cc. stainless steel bomb, through a ¼ inch stainless steel screen located in a dry box. The function of the dry box is the same as that set forth in the prior example. In these examples I have used nitrogen to maintain an inert atmosphere in the grinding and transfer steps; however, any inert gas, e.g., the noble gases, can be used to obtain the same result. The bomb is sealed, heated to a temperature of about 125° C. and pressured with ethylene to about 500 p.s.i. This pressure is maintained by repeated repressurizing with ethylene through the polymerization. After 18 hours the polymerization reaction is terminated and the bomb is cooled and vented. The yield of reaction product after purification by boiling in methanol containing HCl is about 45 grams of solid polyethylene.

The catalyst as above prepared is useful in polymerizing ethylene at temperatures ranging from about room temperature up to about 200° C., and even higher, and at pressures ranging from a few atmospheres, for example 100 p.s.i., to pressures as high as 10,000 p.s.i., and even higher. For practical operation, however, temperatures in the range of 50–200° C. and pressures of 150–1000 p.s.i. are suitable.

Ethylene polymerization is ordinarily performed in 2–48 hours. However, longer periods, e.g. 4 days or more, may be utilized. Generally, if sufficient activated catalyst is present, a longer polymerization period will result in greater polymer yields.

The polymerization reaction is suitably carried out in an inert solvent. Hydrocarbon solvents free from contaminants (especially free from oxygen and oxygen-containing compounds) are preferred. Among the suitable solvents are pentane, hexane, heptane, cyclohexane, octane, benzene, xylene, toluene, and the like.

The amount of catalyst is not critical. Relatively small amounts are operable to form relatively large amounts of polymer. In general, a practical range is 0.001 to 1 g. of catalyst per gram of ethylene polymerized. Even large amounts are operable, but not necessary.

In conducting the ball milling operation it is often convenient to wet grind. For example, a hydrocarbon may be added to the mixture to be ball milled. The hydrocarbon if used is preferably one that will not interfere with the subsequent polymerization reaction. Solvents suitable for use in the polymerization reaction as above described are in general suitable for "wet" ball milling. Such solvents include pentane, hexane, heptane, cyclohexane, octane, benzene, xylene, toluene and the like. The aromatic hydrocarbons are the preferred solvents. The use of such a hydrocarbon in the ball milling step provides a slurry of the catalyst in an inert medium which is easily handled. If the mixture is dry ground it should be done under an inert atmosphere such as pure dry nitrogen or a noble gas. In addition, the resultant milled mixture is extremely pyrophoric and therefore requires careful handling. If desired the mixture can be dry ground under an inert atmosphere of nitrogen or the like, and then the milled mixture can be flushed from the mill with an inert hydrocarbon. Similarly, the milling can be carried out partly by dry grinding in an inert atmosphere and then an inert hydrocarbon can be added to the mill toward the end of the milling in order to slurry the product for ease of handling.

Any grinding or milling whatever of a mixture consisting essentially of Zr and $ZrCl_4$ will provide a catalyst of some activity. Preferably, however, the milling or grinding should be conducted for a number of hours, and suitably for at least 1 day. The $Zr:ZrCl_4$ weight ratio can vary considerably, e.g. from 1 Zr:100 $ZrCl_4$ to 100 Zr:1 $ZrCl_4$. The Zr can be charged to the mill as pieces, granules, flakes, powder, or the like.

The polyethylene obtained by practice of this invention can be used in any conventional manner now being used by polyethylenes formed by prior art procedures. Such uses include film, molding, pipe, tubing, filament, extruded articles and the like.

I claim:

1. The method of preparing a catalyst suitable for the polymerization of olefins to solid polymers which comprises the step of grinding under inert conditions at room temperature and ambient temperatures a mixture consisting essentially of Zr and $ZrCl_4$.

2. The method according to claim 1 in which the mixture is ball milled for at least 1 day.

3. The method according to claim 1 in which the grinding is done in an inert atmosphere.

4. The method according to claim 1 in which the grinding is done in an inert hydrocarbon liquid.

References Cited in the file of this patent

UNITED STATES PATENTS 2,703,794    Roedel _____ Mar. 8, 1955
2,827,447    Nowlin et al. _____ Mar. 18, 1958

(Other references on following page)